Patented July 14, 1942

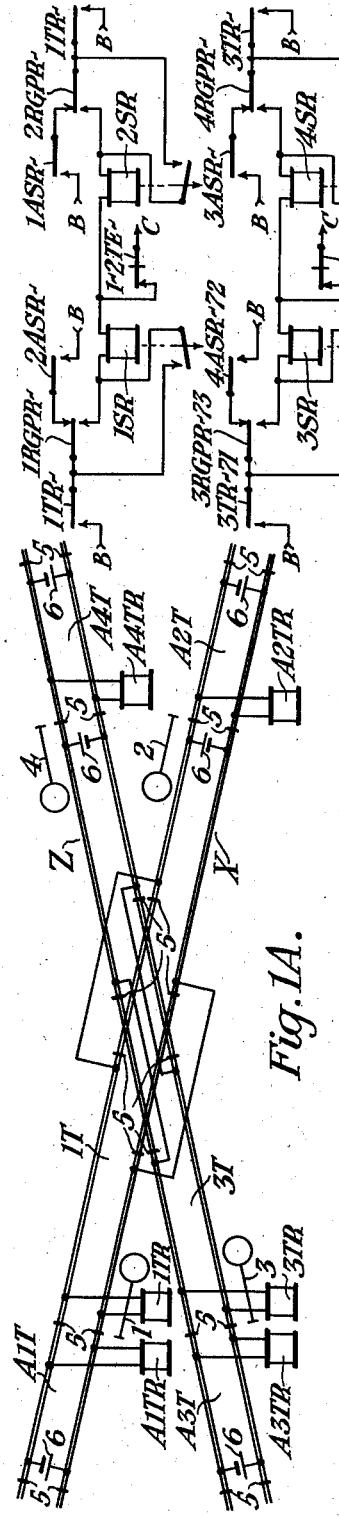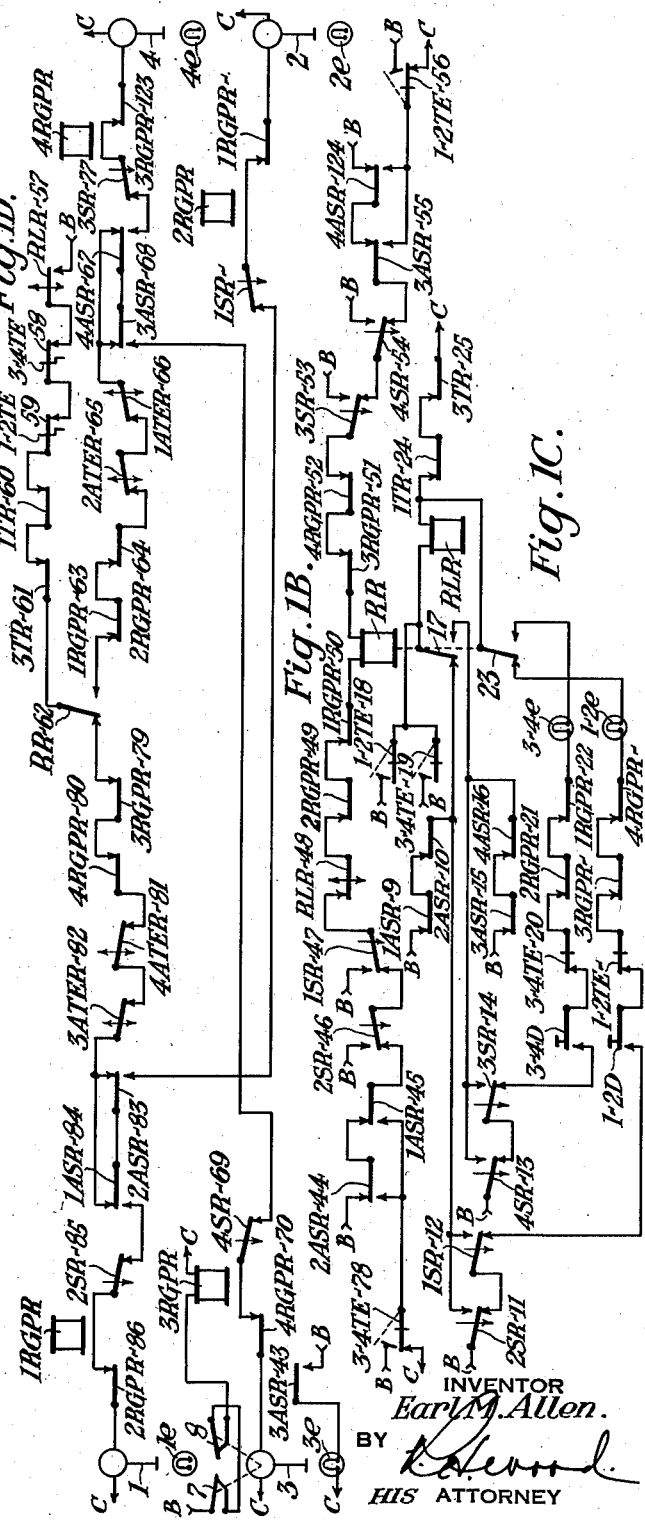

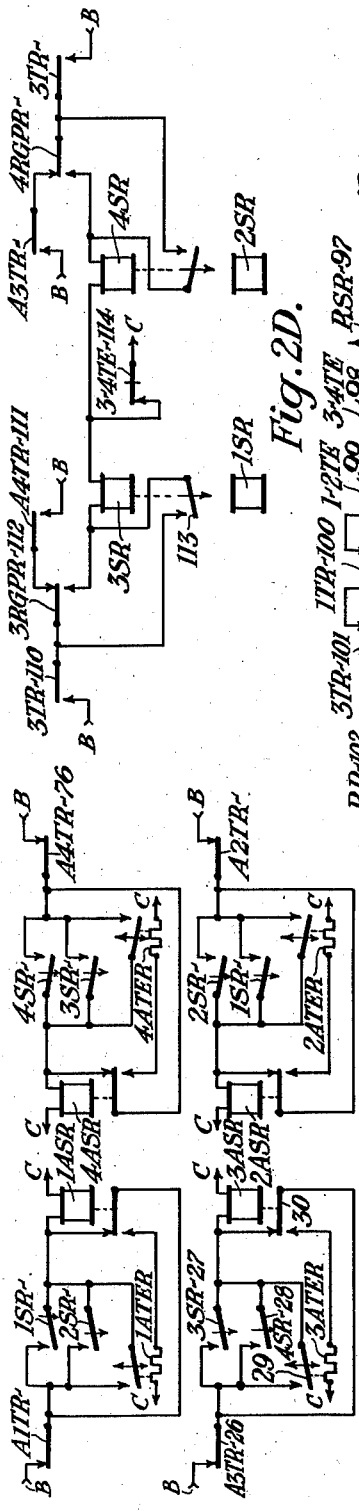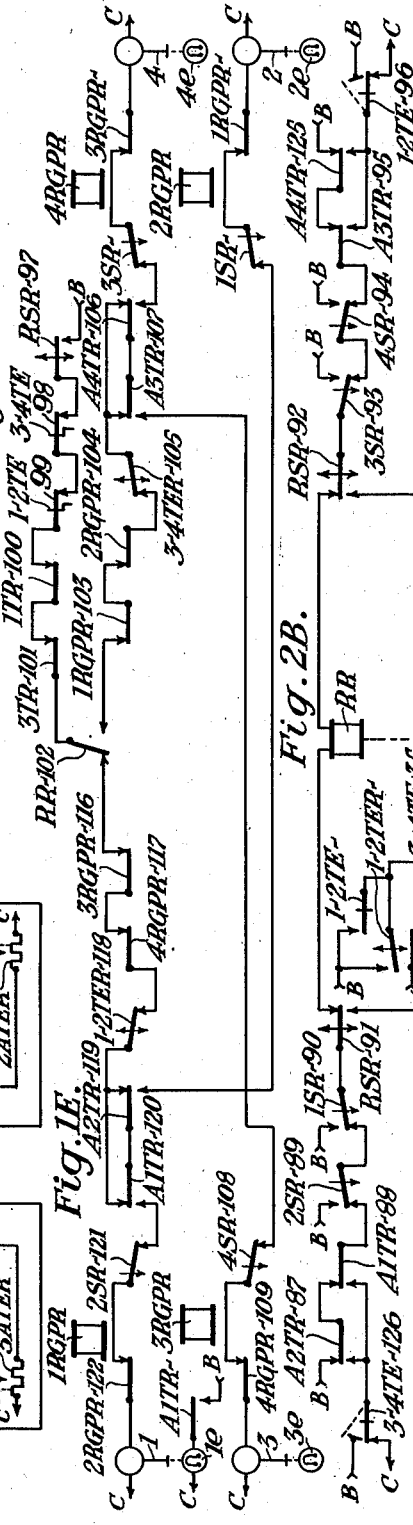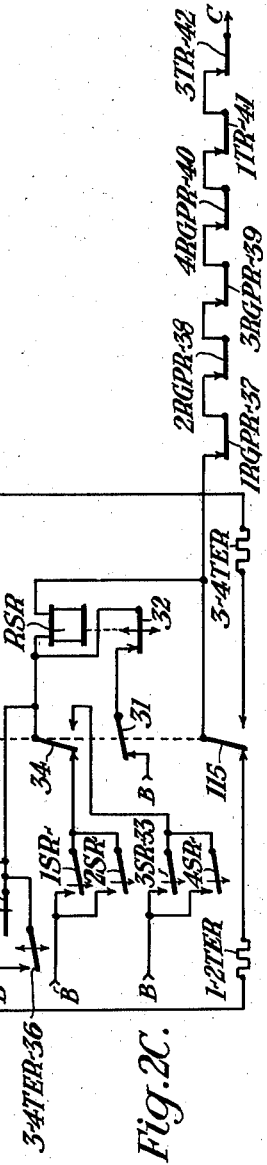

2,289,857

UNITED STATES PATENT OFFICE 2,289,857

RAILWAY SIGNALING

Earl M. Allen, Swissvale, Pa., assignor to The Union Switch & Signal Company, Swissvale, Pa., a corporation of Pennsylvania Application July 27, 1940, Serial No. 347,972

7 Claims. (Cl. 246—114)

My invention relates to railway signaling, and particularly to signaling for the control of traffic movements along intersecting tracks.

A few features of my invention are the provision of a polarized route selecting relay and a neutral route locking relay interconnected so that the route selecting relay can become energized only if the route locking relay is energized, the route locking relay becomes deenergized in response to energization of the route selecting relay, and a signal can be cleared for either of two intersecting tracks only if the route locking relay is deenergized; and protection against loss of train shunt in any of the track sections adjacent the signals for the intersection by use of time element means to effect energization of the route locking relay only upon the lapse of a measured period of time after the loss of shunt occurs, and to effect clearing of a corresponding signal only upon the lapse of a further measured period of time.

I shall describe two forms of apparatus embodying my invention, and shall then point out the novel features thereof in claims.

In the accompanying drawings, Figs. 1A to 1E, inclusive, are diagrammatic views showing one form of apparatus embodying my invention, in which Fig. 1A shows two intersecting railway tracks, with two signals for each track, one on each side of the intersection, for governing traffic movements in opposite directions over the intersection; Fig. 1B shows control circuits for the signals; Fig. 1C shows control circuits for the route selecting and route locking relays; Fig. 1D shows control circuits for receding stick relays; and Fig. 1E shows control circuits for approach stick relays. Figs. 2B to 2D, inclusive, taken with Fig. 1A, show a modified form of apparatus embodying my invention. Figs. 2B to 2D are generally similar to Figs. 1B to 1D, respectively, but differ from Figs. 1B to 1D in that the circuits shown in Figs. 2B to 2D include contacts of approach track section relays instead of contacts of the approach stick relays as in Figs. 1B to 1D; route locking relay RSR in Fig. 2C is provided with stick control whereas the corresponding relay RLR in Fig. 1C does not have stick control; time element devices 1—2TER and 3—4TER are provided for relay RSR in Fig. 2C but omitted in Fig. 1C; and route indication lamps 1—2e and 3—4e are provided in Fig. 1C but not in Fig. 2C.

Similar reference characters refer to similar parts in each of the views.

In each of the views, the contacts operated by the various relays or other devices are identified by numbers, such numbers having distinguishing prefixes from which they are separated by a dash when the contacts are shown apart from the relay or other device by which they are operated. The prefix for each of these contact numbers comprises the reference character for the respective relay or other device by which the associated contact is operated. For example, contact RLR—57 shown adjacent terminal B in the upper right-hand portion of Fig. 1B is identified by the number 57 separated by a dash from the prefix RLR which is the reference character for relay RLR by which this contact is operated. Similarly, contact IATER—66, shown also in the upper right-hand portion of Fig. 1B, in the circuit for signal 4, is identified by the number 66 separated by a dash from the prefix IATER which is the reference character for a time element device by which this contact is operated.

Referring first to Fig. 1A, two intersecting railway tracks are designated by the reference characters X and Z, and are divided into sections by insulated joints 5. Track X is divided into sections AIT, IT and A2T, and track Z is divided into sections A3T, 3T and A4T. A track battery 6 is connected across the rails adjacent one end of each section, and a track relay designated by the reference character R with a prefix comprising the reference character for the associated track section is connected across the rails adjacent the opposite end of each section. Track sections AIT, A2T, A3T and A4T will be referred to as approach sections, and sections IT and 3T will be referred to as crossing track sections.

Signals designated by the reference characters 1 and 2 are located adjacent the ends of track section IT for governing traffic movements in opposite directions on track X across the intersection of the two tracks. Signals designated by the reference characters 3 and 4 are located adjacent the ends of track section 3T for governing traffic movements in opposite directions on track Z across the intersection of the two tracks. As here shown, each of these signals is of the searchlight type, and has a proceed and a stop position, but may be of any other suitable design.

Referring now to Fig. 1B, circuits are here shown for clearing the signals, that is, for operating the mechanisms of the signals to the proceed position. The signal lamp for each signal is designated by the reference character e preceded by the reference character for the associated signal. A circuit is shown for energizing lamp 3e for signal 3. The circuits for energizing the lamps for the other signals are similar to the circuit shown for lamp 3e and are therefore omitted from the drawings:

A signal repeater relay is shown for each signal, designated by the reference character RGPR preceded by the reference character for its signal. A circuit is shown controlled by contacts operated by the mechanism of signal 3 which are closed when the mechanism of signal 3 is in the stop position, for controlling the relay 3RGPR. The repeater relays for the other signals are similarly controlled by contacts operated by their signals, and the circuits for these other repeater relays are therefore omitted from the drawings.

Time element devices 1—2TE and 3—4TE shown in Fig. 1B are manually controllable, and may be of the well-known clockwork release type. Each of these devices has contacts such, for example, as contact 59 of device 1—2TE shown in the upper right-hand portion of Fig. 1B, and contact 3—4TE—75 shown adjacent terminal C in Fig. 1D, in the circuits for the windings of relays 3SR and 4SR, which are closed in only the normal or run-down position. Each of the time element devices 1—2TE and 3—4TE has also contacts, such for example, as contact 1—2TE—56 shown in Fig. 1C at the right-hand end of the circuits for relay RR, which is closed in the normal position and which is also closed when the corresponding time element device or clockwork release is returning to the normal position after having been wound up to the reverse position. This contact may, for example, become closed thirty seconds before the device reaches the normal position, and may be opened again ten seconds before the device reaches the normal position, and then becomes closed again when the device reaches the normal position.

Fig. 1C shows normal and reverse control circuits for route selecting relay RR including front contact RLR—48 of route locking relay RLR, and also shows circuits for route locking relay RLR including polar contact 17 of route selecting relay RR. Circuits are shown including a polar contact 23 of route selecting relay RR in normal and reverse positions for energizing route indication lamps 1—2e and 3—4e, respectively. The circuits for lamps 1—2e and 3—4e also include door contacts 1—2D and 3—4D for the mechanism housings for time element devices 1—2TE and 3—4TE, respectively. These door contacts are normally open, but become closed when the doors are opened for manually controlling the time element devices.

Fig. 1D shows pick-up and stick circuits for the receding stick relays, each of which becomes energized when a train enters a corresponding crossing track section, with the mechanism of a corresponding signal in the proceed position, and which is retained in the energized condition as the train recedes from the intersection.

Fig. 1E shows pick-up and stick circuits for the approach stick relays. A time element device is shown for each of these stick relays, which as shown is of the thermal type and which is controlled by a back contact of the associated approach stick relay.

Figs. 2B and 2C are generally similar to Figs. 1B and 1C, respectively, but differ from them as previously pointed out. Fig. 2D shows pick-up and stick circuits for relays 3SR and 4SR. Relays 1SR and 2SR are controlled by circuits which are similar to those shown for relays 3SR and 4SR, and are therefore omitted from the drawing.

Having described, in general, the arrangement and operation of the various parts of two forms of apparatus embodying my invention, I shall now describe in detail the operation of these forms of apparatus.

As shown in the drawings, all parts are in the normal condition, that is, each of the track sections is unoccupied, and hence the track relays are energized; the mechanism for each of the signals is deenergized, and is hence in the stop position; signal lamps 1e, 2e, 3e and 4e are however unlighted; relays 1RGPR, 2RGPR, 3RGPR, 4RGPR, RLR, 1ASR, 2ASR, 3ASR, 4ASR and RSR are energized; relays RR, 1SR, 2SR, 3SR and 4SR, and time element devices 1ATER, 2ATER, 3ATER, 4ATER, 1—2TER and 3—4TER are deenergized; and route indication lamps 1—2e and 3—4e are unlighted.

With the mechanism of signal 3 in the stop position, relay 3RGPR is energized by a circuit passing from terminal B of a suitable source of current, through contacts 7 and 8 of signal 3, and the winding of relay 3RGPR to terminal C of the same source of current. Relays 1RGPR, 2RGPR and 4RGPR are energized by similar circuits.

Relay RLR is energized by a circuit passing from terminal B, through contacts 1ASR—9 and 2ASR—10, contact 17 of relay RR closed in the left-hand position, winding of relay RLR, and contacts 1TR—24 and 3TR—25 to terminal C.

Relay 3ASR is energized by a stick circuit passing from terminal B, through contact A3TR—26, front point of contact 30 of relay 3ASR, and the winding of relay 3ASR to terminal C. Relays 1ASR, 2ASR and 4ASR are energized by similar stick circuits.

Relay RSR, shown in Fig. 2C, is also energized by a stick circuit passing from terminal B, through contact 31 of relay RR, contact 32 of relay RSR, winding of relay RSR, and contacts 1RGPR—37, 2RGPR—38, 3RGPR—39, 4RGPR—40, 1TR—41 and 3TR—42 to terminal C.

In describing in detail first the operation of the form of apparatus shown in Figs. 1A to 1E, inclusive, I shall assume that a train moving over track Z from left to right as shown in Fig. 1A, which I shall assume is the eastbound direction, enters section A3T, causing relay A3TR to become deenergized. Relay A3TR, upon becoming deenergized, opens the stick circuit for relay 3ASR at contact A3TR—26, causing relay 3ASR to become deenergized. With relay 3ASR deenergized, lamp 3e for signal 3 will be lighted by a circuit passing from terminal B, through contact 3ASR—43, and lamp 3e to terminal C.

Relay 3ASR, upon becoming deenergized, completes a circuit for energizing relay RR by current of reverse polarity, this circuit passing from terminal B, through the front points of contacts 2ASR—44 and 1ASR—45, back points of contacts 2SR—46 and 1SR—47, contacts RLR—48, 2RGPR—49 and 1RGPR—50, winding of relay RR, contacts 3RGPR—51 and 4RGPR—52, back points of contacts 3SR—53, 4SR—54 and 3ASR—55, and contact 1—2TE—56 closed in the normal or run-down position of time element device 1—2TE, to terminal C. Relay RR, upon becoming energized, moves its contact 17 to the reverse position, thereby opening the circuit previously traced for relay RLR. Contact 3ASR—15, in a second circuit for relay RLR which includes contact 17 of relay RR in the reverse position, is already open on account of the deenergization of relay 3ASR.

Upon the deenergization of relay RLR, a circuit is completed for energizing the mechanism of signal 3, this circuit passing from terminal B, through contact RLR—57, contact 58 of time element device 3—4TE, contact 59 of time element device 1—2TE, contacts 1TR—60 and 3TR—61, contact RR—62 closed in the reverse or right-hand position, contacts 1RGPR—63, 2RGPR—64, 2ATER—65, and 1ATER—66, front point of contact 4ASR—67, back point of contact 3ASR—68, contacts 4SR—69 and 4RGPR—70, and the mechanism of signal 3 to terminal C. The mechanism of signal 3 is operated by the circuit just traced to its proceed position for directing traffic movements along track Z.

When the mechanism of signal 3 is operated to the proceed position, one of the contacts 7 or 8 will be opened, causing relay 3RGPR to become deenergized. Relay 3RGPR, upon becoming deenergized, opens its contact 3RGPR—123 in the circuit for signal 4, which is, however, already open at other contacts.

When the train proceeds past signal 3 and enters section 3T, causing relay 3TR to become deenergized, contact 3TR—61 will open the circuit previously traced for the mechanism of signal 3, causing the mechanism of signal 3 to be returned to the stop position. When the mechanism of signal 3 reaches the stop position, relay 3RGPR will again become energized by the circuit previously traced, but before relay 3RGPR opens its back contacts, relay 3SR will become energized by a circuit passing from terminal B, through contact 3TR—71, back point of contact 3RGPR—73, winding of relay 3SR, and contact 3—4TE—75 to terminal C. Relay 3SR, upon becoming energized, completes a stick circuit which is the same as the pick-up circuit just traced except including contact 74 of relay 3SR instead of the back point of contact 3RGPR—73.

As the train proceeds further and leaves section A3TR, relay 3ASR will become energized by a pick-up circuit passing from terminal B, through contacts A3TR—26 and 3SR—27, and the winding of relay 3ASR to terminal C. When relay 3ASR thus becomes energized, the stick circuit previously traced for this relay will also become closed.

When the train enters section A4T, relay 4ASR will become deenergized on account of contact A4TR—76 being opened. With relay 4ASR deenergized, a second stick circuit will be completed for relay 3SR, passing from terminal B, through contact 4ASR—72, front point of contact 3RGPR—73, contact 74 of relay 3SR, winding of relay 3SR, and contact 3—4TE—75 to terminal C.

With relay 3SR energized, relay RLR will become energized, as soon as the train leaves section 3T, by a circuit passing from terminal B, through the back point of contact 4SR—13, front point of contact 3SR—14, contact 17 of relay RR closed in the right-hand position, winding of relay RLR, and contacts 1TR—24 and 3TR—25 to terminal C. The energizing circuit for signal 4 is now open at contact RLR—57 and also at contact 3SR—77, and hence the mechanism of signal 4 will not be operated to the proceed position while the train is receding from the intersection through track section A4T.

If, for any reason, it should be desired that the train in section A4T shall reverse its direction of traffic movement after leaving section 3T and before leaving section A4T, a trainman will make a slight turn of the handle of time element device 3—4TE, causing its contact 3—4TE—75 to open the circuits for relay 3SR. With relay 3SR deenergized, relay RLR will be deenergized on account of the opening of contact 3SR—14 at its front point, and the circuit for the mechanism of signal 4 will then be closed, causing the mechanism of signal 4 to be operated to the proceed position similarly to the manner described for signal 3.

I shall assume that all parts are again in the normal condition, and that again an eastbound train on track Z proceeds over the intersection and is occupying section A4T after leaving section 3T. Relays 3SR and RLR are therefore energized as previously described. If, now, an eastbound train on track X enters section A1T, deenergizing relay 1ASR, relay RR will become energized by current of normal polarity by a circuit passing from terminal B, through the front point of contact 3SR—53, contacts 4RGPR—52 and 3RGPR—51, winding of relay RR, contacts 1RGPR—50, 2RGPR—49 and RLR—48, back points of contacts 1SR—47, 2SR—46 and 1ASR—45, and contact 3—4TE—78 closed in the normal or run-down position of time element device 3—4TE, to terminal C. Relay RR, upon becoming energized by current of normal polarity, will return its contact 17 to the left-hand position, thereby deenergizing relay RLR since contact 1ASR—9 is already open. The mechanism of signal 1 will now be operated to the proceed position by a circuit passing from terminal B, through contact RLR—57, contact 58 of time element device 3—4TE, contact 59 of time element device 1—2TE, contacts 1TR—60 and 3TR—61, contact RR—62 closed in the left-hand position, contacts 3RGPR—79, 4RGPR—80, 4ATER—81 and 3ATER—82, front point of contact 2ASR—83, back point of contact 1ASR—84, contacts 2SR—85 and 2RGPR—86, and the mechanism of signal 1 to terminal C.

I shall now assume that all parts of the apparatus are again in the normal condition, and that again an eastbound train on track Z enters section A3T, causing the mechanism of signal 3 to be operated to the proceed position as previously described, but that a train on track X now enters section A1T and it is desired that the train on track X shall proceed over the intersection before the train on track Z. A trainman will therefore operate time element device 1—2TE, thereby opening contact 59 of this time element device in the circuit traced for the mechanism of signal 3, causing the mechanism of signal 3 to be returned to the stop position.

After time element device 1—2TE has been fully wound up and is returning to the normal position, contact 1—2TE—18 will close for a brief period, completing a circuit for energizing relay RLR passing from terminal B, through contact 1—2TE—18, winding of relay RLR, and contacts 1TR—24 and 3TR—25 to terminal C. At the same time, a circuit will be completed for energizing relay RR by current of normal polarity, this circuit passing from terminal B, through contact 1—2TE—56 closed while time element device 1—2TE is returning from its reverse to its normal position, back points of contacts 3ASR—55, 4SR—54 and 3SR—53, contacts 4RGPR—52 and 3RGPR—51, winding of relay RR, contacts 1RGPR—50, 2RGPR—49 and RLR—48, back points of contacts 1SR—47, 2SR—46 and 1ASR—45, and contact 3—4TE—78 closed in the normal position to terminal C.

As soon as time element device 1—2TE reaches the normal position, its contact 1—2TE—18 will open, thereby deenergizing relay RLR since the circuit first traced for relay RLR is already open at contact 1ASR—9. With relays RLR and 1ASR now deenergized, the mechanism of signal 1 will be operated to the proceed position by the circuit previously traced.

I shall now again assume that all the parts are in the normal condition, that an eastbound train on track Z enters section A3T, and that an eastbound train on track X then enters section A1T. I shall further assume that after signal 3 has cleared, a loss of shunt occurs in section A3T while it is occupied by the train on track Z, so that relay A3TR becomes falsely energized. Relay 3ASR can, however, not now become energized because relays 3SR and 4SR are deenergized. A circuit will, however, be completed for energizing time element device 3ATER, this circuit passing from terminal B, through contact A3TR—26, back point of contact 39 of relay 3ASR, and the control element of device 3ATER to terminal C.

If the loss of shunt in section A3T continues long enough, or if the train on track Z backs off of section A3T, contact 29 of device 3ATER will become closed after the lapse of a measured period of time, thereby completing a second pick-up circuit for relay 3ASR passing from terminal B, through contact A3TR—26, contact 29 of device 3ATER, and the winding of relay 3ASR to terminal C. Time element device 3ATER also opens its contact 3ATER—82 in the circuit previously traced for the mechanism of signal 1.

With relay 3ASR energized, relay RLR will again become energized by a circuit passing from terminal B, through contacts 3ASR—15 and 4ASR—16, contact 17 of relay RR in the right-hand position, winding of relay RLR, and contacts 1TR—24 and 3TR—25 to terminal C. The winding of relay RR will now become energized by current of normal polarity in a circuit passing from terminal B, through the front points of contacts 4ASR—124 and 3ASR—55, back points of contacts 4SR—54 and 3SR—53, contacts 4RGPR—52 and 3RGPR—51, winding of relay RR, contacts 1RGPR—50, 2RGPR—49 and RLR—48, back points of contacts 1SR—47, 2SR—46 and 1ASR—45, and contact 3—4TE—78 closed in the normal position of time element device 3—4TE to terminal C. The circuit for the mechanism of signal 1 cannot, however, become closed until the lapse of a further period of time so that time element device 3ATER can cool off sufficiently for its contact 3ATER—82 to close.

I shall next assume that all parts are again in the normal condition, and that an eastbound train on track Z enters section A3T and then passes signal 3 into section 3T, causing relay 3SR to pick up which, in turn, causes relay 3ASR to become energized after the train leaves section A3T as previously described. If, now, a loss of shunt occurs in section 3T, permitting relay 3TR to be energized falsely, which causes relay 3SR to become deenergized, the second circuit previously traced for energizing relay RLR through contact 17 of relay RR in the right-hand position will be closed but relay RLR, on account of its slow pick-up characteristic, will not at once close its front contact.

As the train proceeds further and enters section A4T, relay 4ASR will become deenergized and open the circuit for relay RLR at contact 4ASR—16. If a train on track X now enters section A1T or A2T, relay RLR cannot become energized on account of relay 3SR being also deenergized, and hence signal 1 or signal 2, respectively, cannot clear until the train on track Z has moved out of section A4T, permitting relay 4ASR to become energized by a circuit controlled by time element device 4ATER.

I shall now trace the operation of the form of apparatus shown in Figs. 2B to 2D, inclusive, taken with Fig. 1A.

I shall assume that with this form of apparatus, an eastbound train on track Z enters section A3T. With relay A3TR thus deenergized, a circuit is completed for energizing relay RR by current of reverse polarity, this circuit passing from terminal B, through the front points of contacts A2TR—87 and A1TR—88, back points of contacts 2SR—89 and 1SR—90, front point of contact RSR—91, winding of relay RR, front point of contact RSR—92, back points of contacts 3SR—93, 4SR—94 and A3TR—95, and contact 1—2TE—96 to terminal C. Relay RR, upon thus becoming energized, will move its polar contacts to the right-hand position, and will then open its back contact 31 in the stick circuit previously traced for relay RSR, causing relay RSR to become deenergized. With relay RSR deenergized, a circuit will be completed for operating the mechanism of signal 3 to the proceed position, this circuit passing from terminal B, through contact RSR—97, contact 98 of time element device 3—4TE, contact 99 of time element device 1—2TE, contacts 1TR—100 and 3TR—101, contact RR—102 closed in the right-hand position, contacts 1RGPR—103, 2RGPR—104 and 3—4TER—105, front point of contact A4TR—106, back point of contact A3TR—107, contacts 4SR—108 and 4RGPR—109, and the mechanism of signal 3 to terminal C. The deenergization of relay RSR causes the circuit traced for relay RR to be opened at the front points of contacts RSR—91 and RSR—92.

When the train enters section 3T, the circuit traced for the mechanism of signal 3 will be opened at contact 3TR—101, causing the mechanism of signal 3 to be returned to the stop position. Also, when the train enters section 3T, relay 3SR will become energized by its pick-up circuit passing from terminal B, through contact 3TR—110, back point of contact 3RGPR—112, winding of relay 3SR, and contact 3—4TE—114 to terminal C. Relay 3SR, upon thus becoming energized, will complete a stick circuit which is the same as the pick-up circuit just traced except including contact 113 of relay 3SR instead of the back point of contact 3RGPR—112.

When the train enters section 4AT, a second stick circuit is completed for relay 3SR passing from terminal B, through contact A4TR—111, front point of contact 3RGPR—112, contact 113 of relay 3SR, winding of relay 3SR, and contact 3—4TE—114 to terminal C.

With relay 3SR energized, relay RSR will become energized by a pick-up circuit when the train leaves section 3T, this circuit passing from terminal B, through contact 3SR—33, contact 34 of relay RR closed in the right-hand position, winding of relay RSR, and contacts 1RGPR—37, 2RGPR—38, 3RGPR—39, 4RGPR—40, 1TR—41 and 3TR—42 to terminal C. The stick circuit previously traced for relay RSR will then become closed. When the train leaves section 3T, relay 3SR will be retained in the energized condition by its second stick circuit previously traced, and hence its contact 3SR—93 will be closed at the front point, thereby permitting a train on track X to now complete a circuit for energizing relay RR by current of normal polarity similarly to the manner described in connection with Figs. 1B to 1E.

I shall again assume that, with the form of apparatus shown in Figs. 2B to 2D, inclusive, an eastbound train on track Z enters section A3T, causing relay RR to become energized by current of reverse polarity, which in turn causes relay RSR to become deenergized, followed by the clearing of signal 3. I shall further assume that a loss of shunt then occurs in section A3T, causing relay A3TR to become falsely energized, which in turn causes signal 3 to indicate stop, and that an eastbound train on track X then enters section A1T. Since relay 3SR has not become energized, relay RSR will not become energized at this time.

A circuit is, however, completed for energizing time element device 3—4TER, this circuit passing from terminal B, through the front points of contacts A4TR—125 and A—3TR—95, back points of contacts 4SR—94, 3SR—93 and RSR—92, control element of time element device 3—4TER, contact 115 of relay RR closed in the right-hand position, and contacts 1RGPR—37, 2RGPR—38, 3RGPR—39, 4RGPR—40, 1TR—41 and 3TR—42 to terminal C. Upon the lapse of a measured period of time, time element device 3—4TER will close its contact 3—4TER—36, thereby completing a circuit for energizing relay RSR, passing from terminal B, through contact 3—4TER—36, winding of relay RSR, and contacts 1RGPR—37, 2RGPR—38, 3RGPR—39, 4RGPR—40, 1TR—41 and 3TR—42 to terminal C. Relay RR will now become energized by a circuit passing from terminal B, through the front points of contacts A4TR—125 and A3TR—95, back points of contacts 4SR—94 and 3SR—93, front point of contact RSR—92, winding of relay RR, front point of contact RSR—91, back points of contacts 1SR—90, 2SR—89 and A1TR—88, and contact 3—4TE—126 closed in the normal position of its time element device to terminal C.

Relay RR, upon thus becoming energized by current of normal polarity, will move its polar contacts to the left-hand position, and will then open its back contact 31, thereby denergizing relay RSR and completing a circuit for operating the mechanism of signal 1 to the proceed position, this circuit passing from terminal B, through contact RSR—97, contact 98 of time element device 3—4TE, contact 99 of time element device 1—2TE, contacts 1TR—100 and 3TR—101, contact RR—102 closed in the left-hand position, contacts 3RGPR—116, 4RGPR—117 and 1—2TER—118, front point of contact A2TR—119, back point of contact A1TR—120, contacts 2SR—121 and 2RGPR—122, and the mechanism of signal 1 to terminal C.

I have traced for a few typical examples the operation of two forms of apparatus embodying my invention. In view of these examples, it is believed that the operation of each of the two forms of apparatus for any other possible traffic movement can be readily traced upon referring to the drawings.

Although I have herein shown and described only two forms of railway signaling embodying my invention, it is understood that various changes and modifications may be made therein within the scope of the appended claims without departing from the spirit and scope of my invention.

Having thus described my invention, what I claim is:

1. Control apparatus for railway signaling for intersecting tracks in which two signals are provided one for each of said tracks for governing traffic movements on its track over the intersection, comprising in combination, a polarized route selecting relay, a neutral route locking relay, a normally energized train detecting relay for each of said signals each of which becomes deenergized in response to a train arriving at a given point in the rear of its signal while aproaching the intersection, a normal control circuit for energizing said route selecting relay by current of normal polarity controlled by front contacts of said route locking relay and of a given one of said train detecting relays as well as by a back contact of the other train detecting relay, a reverse control circuit for energizing said route selecting relay by current of reverse polarity controlled by front contacts of said route locking relay and of said other train detecting relay as well as by a back contact of said given train detecting relay, means controlled by said route selecting relay upon becoming energized for deenergizing said route locking relay, circuits for effecting clearing of a given one or the other of said signals controlled by a normal or a reverse polar contact respectively of said route selecting relay and by a back contact of said route locking relay, and means responsive to a train after moving over the intersection for again energizing said route locking relay.

2. Control apparatus for railway signaling for intersecting tracks in which two signals are provided one for each of said tracks for governing traffic movements on its track over the intersection, comprising in combination, a polarized route selecting relay, a neutral route locking relay, normal and reverse control circuits for energizing said route selecting relay by current of normal or reverse polarity in response to a train arriving at a given point in the rear of a given one or the other of said signals respectively while said route locking relay is energized, means responsive to said route selecting relay upon becoming energized for deenergizing said route locking relay, circuits for effecting clearing of said given one or the other of said signals controlled by a normal or a reverse polar contact respectively of said route selecting relay if said route locking relay becomes deenergized, and means responsive to a train after moving over the intersection for again energizing said route locking relay.

3. Control apparatus for railway signaling for intersecting tracks, comprising in combination, a route locking relay, route selecting means for selectively preparing signal clearing means for a given one or the other of said tracks in response to a train on the corresponding track arriving at a point a given distance from the intersection while approaching the intersection if said route locking relay is energized, means responsive to said route selecting means for deenergizing said route locking relay upon operation of said route selecting means to prepare the signal clearing means, means controlled by said route locking relay upon becoming deenergized for completing the signal clearing means, and means responsive to a train after moving over the intersection for again energizing said route locking relay.

4. Control apparatus for railway signaling for intersecting tracks, comprising in combination, a route locking relay, route selecting means for selectively preparing signal clearing means for a given one or the other of said tracks in response to a train on the corresponding track arriving at a point a given distance from the intersection while approaching the intersection if said route locking relay is energized, means responsive to said route selecting means upon operation of said route selecting means for deenergizing said route locking relay to complete the signal clearing means, means responsive to a train after moving over the intersection for again energizing said route locking relay, and time element means for effecting energization of said route locking relay upon the lapse of a measured period of time after a failure of the control of said route selecting means by an approaching train.

5. Control apparatus for railway signaling for intersecting tracks, comprising in combination, a route locking relay, route selecting means for selectively preparing signal clearing means for a given one or the other of said tracks in response to a train on the corresponding track arriving at a point a given distance from the intersection while approaching the intersection if said route locking relay is energized, means responsive to said route selecting means for deenergizing said route locking relay upon operation of said route selecting means to prepare the signal clearing means, means controlled by said route locking relay upon becoming deenergized for completing the signal clearing means, a manually controllable time element device for each of said tracks, a contact of each of said time element devices operable for interrupting the signal clearing means for both of said tracks, and circuit means controlled by other contact means of each of said time element devices for energizing said route locking relay for a brief period of time and for operating said route selecting means to prepare the signal clearing means for the corresponding track upon the lapse of a measured period of time after the signal clearing means for the other track has been interrupted by the first contact of the same time element device.

6. Control apparatus for railway signaling for intersecting tracks, comprising in combination, a route locking relay, a normally energized train detecting device for each of said tracks each of which becomes deenergized in response to a train arriving on its track at a point a given distance from the intersection while the train is approaching the intersection, route selecting means for selectively preparing signal clearing means for a given one or the other of said tracks in response to deenergization of the corresponding train detecting device if said route locking relay is energized, means responsive to said route selecting means for then deenergizing said route locking relay to complete the signal clearing means for the corresponding track, a time element device for each of said tracks, means controlled by the time element device for each track for retaining the signal clearing means for its track intact a measured period of time after the train detecting device for its track becomes falsely operated to its energized position and means controlled by the same time element device for then energizing said route locking relay, and means controlled by the same time element device for then completing the signal clearing means for the other track only upon the lapse of a further measured period of time if the train detecting device for said other track is deenergized.

7. Control apparatus for railway signaling for intersecting tracks in which two signals are provided one for each of said tracks for governing traffic movements on its track over the intersection, comprising in combination, a route locking relay, a normally energized train detecting device for each of said tracks each of which becomes deenergized in response to a train arriving on its track at a point a given distance from the intersection while the train is approaching the intersection, route selecting means for selectively preparing signal clearing means for a given one or the other of said tracks in response to deenergization of the corresponding train detecting device if said route locking relay is energized, means responsive to said route selecting means for then deenergizing said route locking relay to complete the signal clearing means for the corresponding track, a time element device for each of said tracks, and means controlled by the time element device for each track for energizing said route locking relay upon the lapse of a measured period of time if the train detecting device for its track becomes falsely operated to its energized position when it should remain deenergized while its track is occupied within said given distance from the intersection by a train approaching the signal for its track.

EARL M. ALLEN.